Feb. 5, 1946. T. McKEE 2,394,322
DECORATED CAKE
Filed Sept. 12, 1941

INVENTOR
Thomas McKee

Patented Feb. 5, 1946

2,394,322

UNITED STATES PATENT OFFICE 2,394,322

DECORATED CAKE

Thomas McKee, Jackson Heights, N. Y., assignor of seven and one-half per cent to A. Winburn, New York, N. Y.

Application September 12, 1941, Serial No. 410,567

2 Claims. (Cl. 99—92)

This invention relates generally to bakery products. More particularly my invention relates to an improved method for decorating layer or similar cakes.

One of the objects of my invention is to provide a highly improved and novel method of decorating cakes of the class described by means of which the cake may be ornamented with any desired pictorial design or with printed matter, and which shall at the same time lend itself readily to large scale production, thus making it possible to produce a highly decorated cake at a relatively low cost.

Another object of my invention is to provide as an article of manufacture a novel and improved decorated cake of the class described which shall represent a general improvement in the art.

Other objects of my invention will become apparent in the following detailed description thereof.

Figure 1:
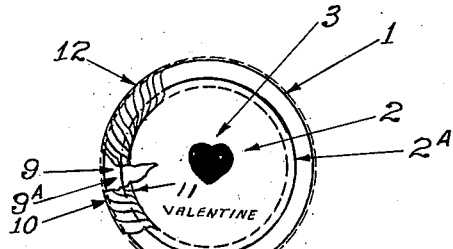
Figure 2:
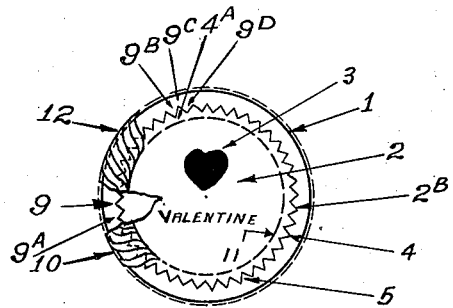
Figure 3:
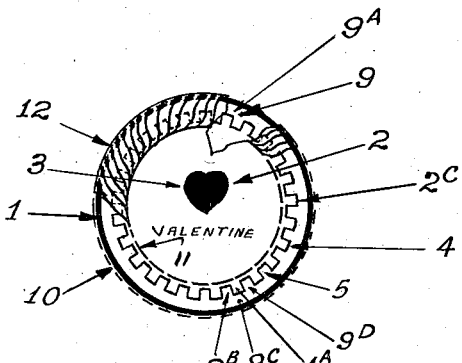
Figure 4:
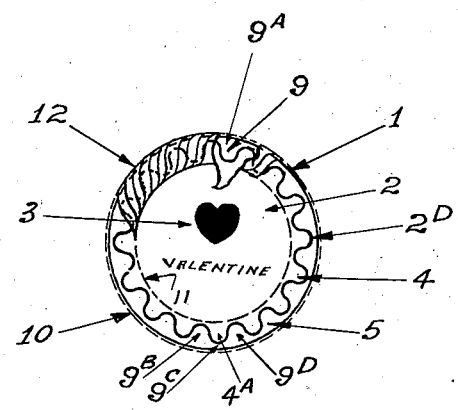
Figure 5:
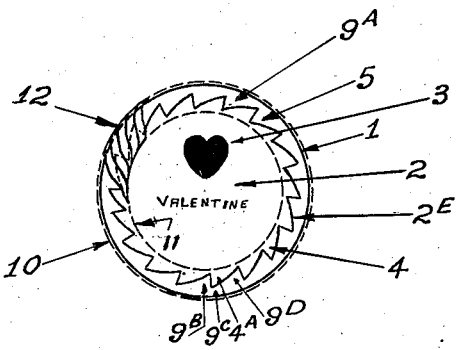

In the accompanying drawing, in which is shown various possible embodiments of my invention, Fig. 1 is a top plan view of a cake decorated and arranged in accordance with my invention and having a portion broken away to disclose the construction thereof; and Figs. 2, 3, 4, 5 and 6 are views similar to Fig. 1, but illustrating modified forms of my invention.

Referring now in detail to the drawing and more particularly to Fig. 1 thereof, I have shown a plan view of a cake 1 constructed and arranged in accordance with my invention and made of any suitable cake ingredients well known to the art for layer or similar cakes.

The top surface of the cake may be iced or frosted, if desired, or it may be any type of plain cake surface. Overlying the said top surface of the cake is a disc-like member or sheet 2, preferably flat and thin on the nature of wafer paper. The said sheet 2 is made of edible material, such as, for example, rice paper or the like and contains thereon an ornamental design of any nature desired, or printed reading matter, which may be imprinted thereon with edible ink or placed thereon in any other suitable manner well known to the graphic arts, it being understood that all the materials or ingredients necessary for the printing process shall be of a harmless, edible nature.

It is noted that my sheet 2 is made smaller in size than that of the surface of the cake upon which it rests, so as to provide a marginal space 9A between the peripheral edge 2A of the sheet 2 and the periphery of the surface of the cake 1. To retain the sheet 2 against displacement, I provide a decorative border 10 of any suitable cake frosting composition known to the art, the said border 10 being of sufficient width so as to overlap a portion of the sheet 2 and the marginal space 9A, such as, for example, the area contained between the dotted lines 11 and 12.

In Figs. 2 to 5 I have shown modified forms of my invention by means of which I am able to provide a better retention or grip of the decorated disc 2 by the decorative border so as to further insure against displacement. To this end I may provide the peripheral edge of the sheet 2 with notches, as in Figs. 2 or 3, or with scallops as in Fig. 4, or serrations as in Fig. 5.

Figure 6:
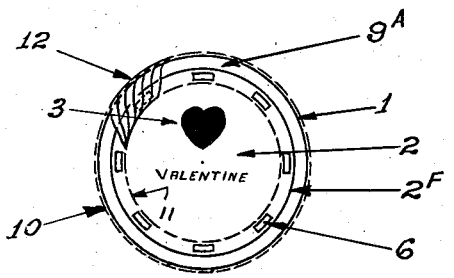

In Fig. 6 I accomplish the same result as with the Figs. 2 to 5 forms of my invention by providing circumferentially spaced openings or notches B disposed adjacent the periphery of the sheet 2. In all the forms of my invention shown in Figs. 2 to 6, the material of the decorative border 10 will enter the spaces of the notches, scallops or serrating to assist in retention of the sheet 2.

While in the drawing I have shown my invention as utilizing a disc or sheet 2 of circular shape, it is noted that any other suitably shaped sheet may be satisfactorily employed. Also, while in the drawing my invention is illustrated in connection with the decoration of the top of a cake, it is understood that my invention also contemplates the similar decoration of the side or other walls of a cake.

It is thus seen that I have provided an article and method in which the several objects of this invention are achieved and which is well adapted to meet the conditions of practical use.

As various possible embodiments might be made of the above invention, and as various changes might be made in the embodiments above set forth, it is to be understood that all matter herein set forth or shown in the accompanying drawing is to be interpreted as illustrative and not in a limiting sense.

I claim:

1. In a cake, the combination of a relatively thin sheet of edible wafer paper overlying the top surface of said cake, the top surface of said sheet being suitably ornamented with subject matter executed in edible ink, said sheet being provided with notches adjacent the periphery thereof, and a decorative border of edible frosting material on said sheet overlying said notches so that the material of said frosting will be received in said notches to hold said sheet against displacement.

2. In a cake, the combination of a relatively thin sheet of edible wafer paper overlying the top surface of said cake, the top surface of said sheet being suitably ornamented with subject matter executed in edible ink, the periphery of said sheet being spaced from the periphery of said top surface of said cake, leaving an exposed surface portion on said cake top surrounding said sheet, a decorative border of edible frosting material overlying a portion of the top surface of said sheet adjacent the periphery thereof and said exposed surface to prevent displacement of said sheet, and notches adjacent the periphery of said sheet to receive the material of said decorative border therein to more positively prevent displacement of said sheet.

THOMAS McKEE.